United States Patent
Moriguchi

(10) Patent No.: US 9,473,252 B2
(45) Date of Patent: Oct. 18, 2016

(54) MODULATION APPARATUS, DEMODULATION APPARATUS, AUDIO TRANSMISSION SYSTEM, PROGRAM, AND DEMODULATION METHOD

(71) Applicant: YAMAHA CORPORATION, Hamamatsu-shi, Shizuoka (JP)

(72) Inventor: Shota Moriguchi, Tokyo (JP)

(73) Assignee: YAMAHA CORPORATION, Hamamatsu-shi (JP)

( * ) Notice: Subject to any disclaimer, the term of this patent is extended or adjusted under 35 U.S.C. 154(b) by 190 days.

(21) Appl. No.: 14/361,611

(22) PCT Filed: Feb. 13, 2014

(86) PCT No.: PCT/JP2014/053266
§ 371 (c)(1),
(2) Date: May 29, 2014

(87) PCT Pub. No.: WO2014/129370
PCT Pub. Date: Aug. 28, 2014

(65) Prior Publication Data
US 2015/0036464 A1 Feb. 5, 2015

(30) Foreign Application Priority Data

Feb. 21, 2013 (JP) ................. 2013-032506
Nov. 28, 2013 (JP) ................. 2013-246685

(51) Int. Cl.
*H04B 11/00* (2006.01)

(52) U.S. Cl.
CPC ..................... *H04B 11/00* (2013.01)

(58) Field of Classification Search
CPC .................. H04J 1/00; H04B 11/00
See application file for complete search history.

(56) References Cited

U.S. PATENT DOCUMENTS 5,335,359 A   8/1994   Tsujimoto et al.
5,859,870 A   1/1999   Tsujimoto
(Continued)

FOREIGN PATENT DOCUMENTS

EP   0459823 A2   12/1991
EP   0771084 A1   5/1997
(Continued)

OTHER PUBLICATIONS

Extended European Search Report issued in EP14725906.3, mailed Oct. 12, 2015.
(Continued)

*Primary Examiner* — Daniel Pihulic
(74) *Attorney, Agent, or Firm* — Rossi, Kimms & McDowell LLP

(57) ABSTRACT

A problem is to increase possibility of extracting data from sound in a system which transmits data using the sound as a transmission medium. Frames are transmitted while shifting the transmission timing among a plurality of frequency bands, whereby tolerance for multipath fading, noise mixing, or the like is obtained and improvement of a substantial transmission rate can be expected compared to a case where one frame is transmitted using only one frequency band. When selecting blocks forming a frame, since a block is selected under a condition that a time period necessary for collecting sound, on which the blocks to be selected are superimposed, becomes shorter, even if a phenomenon, in which a substantial rate of data transmission decreases, occurs, it becomes possible to suppress a decrease in rate.

11 Claims, 10 Drawing Sheets

(56) References Cited

U.S. PATENT DOCUMENTS

| | | |
|---|---|---|
| 6,205,127 B1 | 3/2001 | Ramesh |
| 2001/0006535 A1 | 7/2001 | Csomo |
| 2009/0067292 A1 | 3/2009 | Matsuoka |
| 2009/0097584 A1 | 4/2009 | Takai et al. |
| 2011/0150240 A1 | 6/2011 | Akiyama et al. |
| 2015/0036464 A1* | 2/2015 | Moriguchi ............... H04J 1/00 367/137 |

FOREIGN PATENT DOCUMENTS

| | | | |
|---|---|---|---|
| EP | 1119114 A2 | 7/2001 | |
| EP | 1998476 A1 | 12/2005 | |
| JP | 03-229523 A | 10/1991 | |
| JP | 06-164555 A | 6/1994 | |
| JP | 2002-300097 A | 10/2002 | |
| JP | 2004-297142 A | 10/2004 | |
| JP | 2006-251676 A | 9/2006 | |
| JP | 2010-288246 A | 12/2010 | |
| JP | 2012222463 A | 11/2012 | |
| JP | WO 2014129370 A1 * | 8/2014 | ............. H04B 11/00 |
| JP | KR 20140128942 A * | 11/2014 | ............. H04B 11/00 |
| JP | EP 2849365 A4 * | 11/2015 | ............. H04B 11/00 |
| KR | 1020080106461 A | 12/2008 | |

OTHER PUBLICATIONS

International Search Report (ISA 210) issued in PCT/JP2014/053266, dated Mar. 11, 2014.

Written Opinion of the International Searching Authority (ISA 237) issued in PCT/JP2014/053266, dated Mar. 11, 2014.

Office Action issued in Korean Appln No. 10-2014-7014727 dated Apr. 27, 2015. English translation provided.

Taiwanese Office Action issued in Taiwanese counterpart application No. TW103104313, dated Jul. 22, 2015. English translation provided.

* cited by examiner

MODULATION APPARATUS, DEMODULATION APPARATUS, AUDIO TRANSMISSION SYSTEM, PROGRAM, AND DEMODULATION METHOD

This application is a U. S. National Phase Application of PCT International Application PCT/JP2014/053266 filed on Feb. 13, 2014, which is based on and claims priority from JP 2013-032506 filed on Feb. 21, 2013 and JP 2013-246685 filed on Nov. 28, 2013, the contents of which is incorporated in its entirety by reference.

TECHNICAL FIELD

The present invention relates to a technique for transmitting data using sound (sound wave) as a transmission medium.

BACKGROUND ART

As a technique for transmitting data using an audio signal or sound (sound wave) as a transmission medium, techniques described Patent Literatures 1 and 2 are known. In the technique described in Patent Literature 1, a modulation apparatus on a sound emission side modulates a spread code with a data code, performs differential encoding for the modulated spread code, multiplies by a carrier signal, performs a frequency shift, and outputs the differential code as a modulated signal. A demodulation apparatus on a sound collection side applies delay detection to an input modulated signal with a delay time for one chip of the differential code, detects synchronization between the delay-detected signal waveform and the spread code, and demodulates the data code based on the peak polarity of the detected synchronization point. In the technique described in Patent Literature 2, an electronic watermark is embedded in an audio signal by means of amplitude modulation, and the electronic watermark is extracted from the audio signal based on temporal and intensity features of fluctuation in amplitude.

CITATION LIST

Patent Literature

Patent Literature 1: JP-A-2010-288246
Patent Literature 2: JP-A-2006-251676

SUMMARY OF INVENTION

Technical Problem

On the other hand, when transmitting data using sound, a system which superimposes data on sound in a specific frequency band is known. In this system, the following problem is considered. For example, when the environment of data transmission is a space with much reverberant sound (reflected sound) or when a speaker as sound emission means and a microphone as reception means do not directly face each other, the influence of reflected sound, so-called multipath fading, occurs, sound in a frequency band for data transmission is reduced or the volume level decreases, and superimposed data may not be extracted. Also, when noise (for example, brake sound of a vehicle, noise of equipment, or the like) at a frequency conforming to a frequency band for data transmission is mixed from the outside, superimposed data may not be extracted. In the system which superimposes data on sound belonging to a specific frequency band, a phenomenon, such as multipath fading or noise mixing, occurs, and data may not be extracted from sound.

Accordingly, an object of the present invention is to increase possibility of extracting data from sound in a system which transmits data using sound as a transmission medium.

Solution to Problem

In order to solve the problem as mentioned above, a modulation apparatus according to an aspect of the present invention includes: a delay unit, configured to delay a transmission start timing of a frame corresponding to one unit of transmission data by a predetermined time period; and a modulated signal generation unit, configured to generate a modulated signal by modulating a carrier wave in a frequency band which is different depending on the transmission start timing by using the frame whose transmission start timing is delayed by the delay unit.

The modulation apparatus may be configured by further including a sound emission unit, configured to emit sound according to the modulated signal generated by the modulated signal generation unit.

Moreover, a demodulation apparatus according to an aspect of the present invention includes: a separation unit, configured to use a frame corresponding to one unit of transmission data and having a transmission start timing delayed by a predetermined time period to separate an audio signal of sound emitted according to a modulated signal generated by modulating a carrier wave in a frequency band which is different depending on the transmission start timing into signal components belonging to the respective frequency bands; and a frame generation unit, configured to demodulate a block corresponding to a part of the frame for each predetermined time period based on each signal component separated by the separation unit, and connect blocks selected from a demodulated block group according to a prescribed selection method to generate the frame.

It may be configured so that frequency bands of carrier waves modulated by modulated signal generation unit are n frequency bands, where n indicates a positive integer, and the frame generation unit demodulates the block based on each signal component for each time period of 1/n of a time period in which one frame is superimposed in any of the n frequency bands.

It may be configured so that each of the frequency bands includes a plurality of narrow-band frequencies having bandwidth narrower than the corresponding frequency band, the modulated signal generation unit generates the modulated signal by causing outputs of signals belonging to two narrow-band frequencies corresponding to the frame to be inverted between the signals according to a value of each bit of the frame, the separation unit separates the audio signal into signals belonging to the two narrow-band frequencies included in each of the frequency bands, and the frame generation unit compares a difference between the signals belonging to the two narrow-band frequencies with a threshold value and decodes each value of the bits to demodulate the block.

It may be configured so that the frame generation unit calculates an upper envelope and a lower envelope of each signal component separated by the separation unit and uses a time-varying value between the calculated upper envelope and the lower envelope as the threshold value.

Moreover, an audio communication system according to an aspect of the present invention includes: a transmission apparatus for emitting an audio signal, on which transmission data to be transmitted is superimposed, as sound; and a reception apparatus for extracting the transmission data from the sound emitted from the transmission apparatus, wherein the transmission apparatus includes: a delay unit, configured to delay a transmission start timing of a frame corresponding to one unit of the transmission data by a predetermined time period; a modulated signal generation unit, configured to generate a modulated signal by modulating a carrier wave in a frequency band which is different depending on the transmission start timing by using the frame whose transmission start timing is delayed by the delay unit; and a sound emission unit, configured to emit the sound according to the modulated signal generated by the modulated signal generation unit, and the reception apparatus includes: a sound collection unit, configured to collect the sound emitted from the sound emission unit and output an audio signal; a separation unit, configured to separate the audio signal output from the sound collection unit into signal components belonging to the respective frequency bands; and a frame generation unit, configured to demodulate a block corresponding to a part of the frame for each predetermined time period based on each signal component separated by the separation unit, and connect blocks selected from a demodulated block group according to a prescribed selection method to generate the frame.

Moreover, a program according to an aspect of the present invention is a program which causes a computer to execute: a separation step of using a frame corresponding to one unit of transmission data and having a transmission start timing delayed by a predetermined time period to separate an audio signal of sound emitted according to a modulated signal generated by modulating a carrier wave in a frequency band which is different depending on the transmission start timing into signal components belonging to the respective frequency bands; and a frame generation step of demodulating a block corresponding to a part of the frame for each predetermined time period based on each signal component separated by the separation step, and connecting blocks selected from a demodulated block group according to a prescribed selection method to generate the frame.

A demodulation method according to an aspect of the present invention includes: a separation step of using a frame corresponding to one unit of transmission data and having a transmission start timing delayed by a predetermined time period to separate an audio signal of sound emitted according to a modulated signal generated by modulating a carrier wave in a frequency band which is different depending on the transmission start timing into signal components belonging to the respective frequency bands; and a frame generation step of demodulating a block corresponding to a part of the frame for each predetermined time period based on each signal component separated by the separation step, and connecting blocks selected from a demodulated block group according to a prescribed selection method to generate the frame.

Advantageous Effects of Invention

According to the present invention, it is possible to increase possibility of extracting data from sound in a system which transmits data using sound as a transmission medium.

DESCRIPTION OF EMBODIMENTS

[1. Outline of Audio Transmission System]

An audio transmission system according to an embodiment of the present invention is a system which transmits and receives information to be transmitted with sound (sound wave) as a transmission medium. The audio transmission system includes at least a transmission apparatus which emits sound while superimposing information on an audio signal, and a reception apparatus which collects sound and extracts information. Since the emission of sound with information superimposed thereon corresponds to the transmission of information, hereinafter, it is described as necessary that the transmission apparatus transmits information. Furthermore, since the collection of sound with information superimposed thereon corresponds to the reception of information, hereinafter, it is described as necessary that the reception apparatus receives information.

Although the audio transmission system is used in, for example, the following situations (1) to (3), the present invention is not necessarily limited to these examples.

(1) Information for advertising goods or services is superimposed on sound and transmitted from a transmission apparatus which is provided at a location, such as a road or a store, at which a plurality of users are present, to a reception apparatus, such as a smartphone, which is carried by each user.

(2) A television apparatus in a house functions as a transmission apparatus, and information relating to, for example, a television program is superimposed on sound and transmitted from the television apparatus to a reception apparatus, such as a smartphone or a personal computer, which is used by a user.

(3) One of mobile devices, such as smartphones, which are carried by multiple users functions as a transmission apparatus, the other mobile devices function as a reception apparatus, and individual information, such as contact information of the user, is superimposed on sound and transmitted from the transmission apparatus to the reception apparatus.

In this embodiment, information to be transmitted is repeatedly transmitted in time series. For example, in the example of (1), the same information for advertising goods or services is repeatedly transmitted from the transmission apparatus to the reception apparatus. The reception apparatus performs processing, such as information display, when the information can be normally received. Of course, information to be transmitted may be transmitted once, instead of being repeatedly transmitted.

In the situations (1) to (3), information to be transmitted may be superimposed on sound in an inaudible area or information superimposed on sound in an inaudible area may be further superimposed on music or voice belonging to an audible area, such as background music. Alternatively, information to be transmitted may be superimposed on sound in an inaudible area while there is no music or voice in an audible area.

[2. Overall Configuration of Audio Transmission System]

Figure 1:
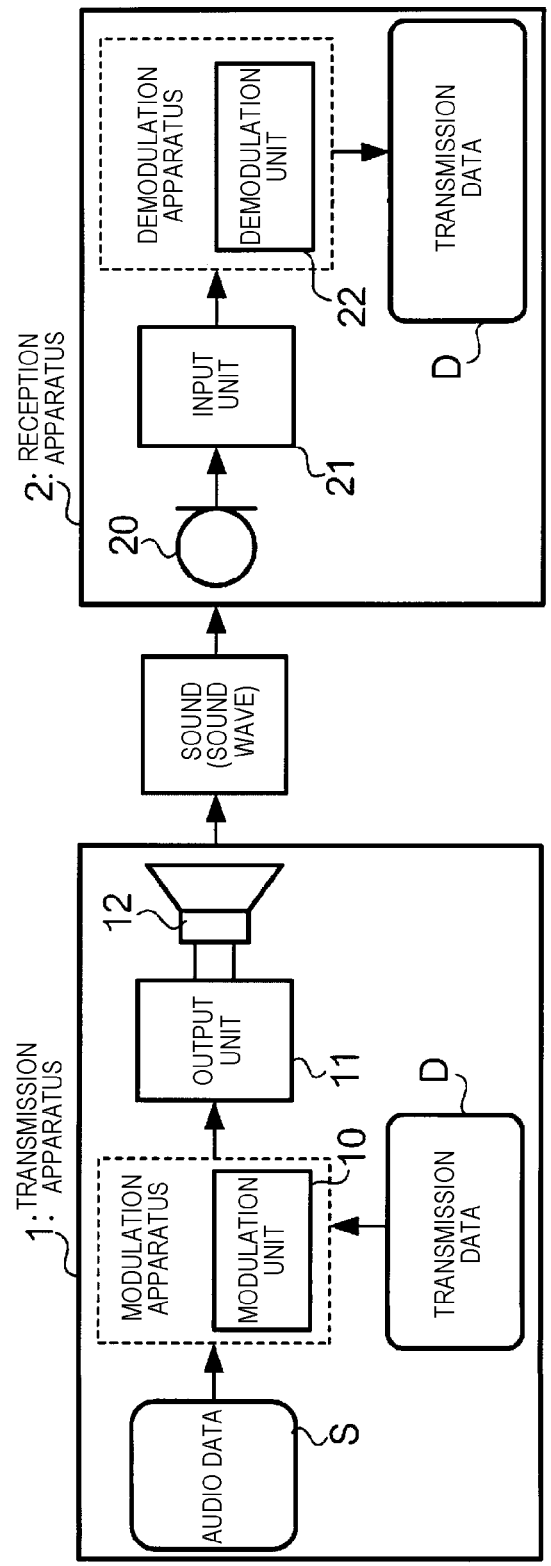
FIG. 1 is a block diagram showing a configuration example of an audio transmission system according to an embodiment of the present invention.

FIG. 1 is a block diagram showing a configuration example of an audio transmission system. Here, although a minimum configuration including a transmission apparatus 1 and a reception apparatus 2 is shown for simplification of description, each of the transmission apparatus 1 and the reception apparatus 2 may include a configuration other than the configuration shown in the drawing.

The transmission apparatus 1 includes a modulation unit 10, an output unit 11, and a speaker 12. The modulation unit 10 is an example of a modulation apparatus according to the present invention, and is means for modulating a carrier wave belonging to a high frequency band by transmission data D to be transmitted and superimposing on audio data S. The term "high frequency band" used herein is a frequency band higher than the upper limit value (from ten and several kHz to about 20 kHz) of a frequency band of human audible sound. For example, in the example of (1), the audio data S is music, such as background music, or voice on a road or at a store, and the transmission data D is information for advertising goods or services. The audio data S and the transmission data D may be stored in, for example, a storage medium of the transmission apparatus 1 or may be supplied from the outside of the transmission apparatus 1 to the transmission apparatus 1. The output unit 11 includes a D/A converter which converts a digital signal output from the modulation unit 10 to an analog signal, and an amplifier which amplifies the analog signal output from the D/A converter and supplies the amplified analog signal to the speaker 12. The speaker 12 is a sound emission unit for emitting sound according to the analog signal input from the output unit 11. Emitted sound propagates through a space (the air) and is collected by a microphone 20 of the reception apparatus 2.

The reception apparatus 2 includes a microphone 20, an input unit 21, and a demodulation unit 22. The microphone 20 is a sound collection unit for collecting sound emitted from the speaker 12 and outputting an audio signal according to the sound. The input unit 21 includes an amplifier which amplifies the audio signal output from the microphone 20, and an A/D converter which converts the analog audio signal output from the amplifier to a digital signal. The demodulation unit 22 is an example of a demodulation apparatus according to the present invention, and demodulates the transmission data D from the digital signal output from the A/D converter. The transmission data D is a bit stream having "1" and "0", and is used for a predetermined purpose, for example, is supplied to a display apparatus (not shown) connected to the reception apparatus 2 and displayed as information on the display apparatus or supplied to a communication apparatus (not shown) connected to the reception apparatus 2 and transmitted from the communication apparatus to the outside.

Figure 15:
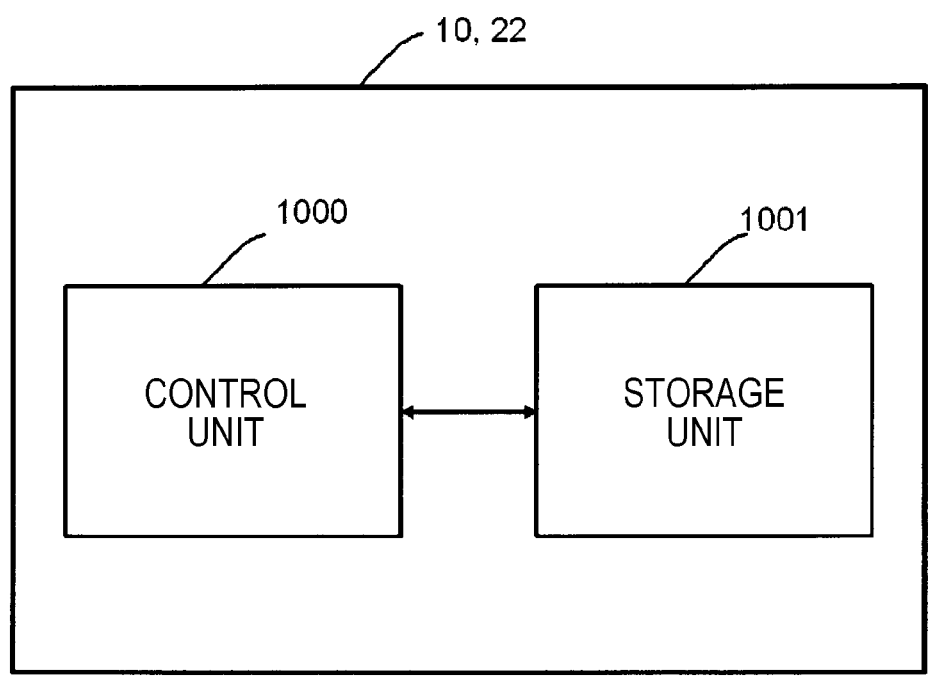
FIG. 15 is a block diagram showing a configuration example of a modulation unit of a transmission apparatus or a demodulation unit of a reception apparatus.

The configuration of each of the modulation unit 10 of the transmission apparatus 1 and the demodulation unit 22 of the reception apparatus 2 may be realized by hardware or may be realized by cooperation of hardware and software. For example, as shown in FIG. 15, hardware of the modulation unit 10 when the configuration of the modulation unit 10 is realized by cooperation of hardware and software is configured as a computer. In this case, as shown in FIG. 15, the modulation unit 10 includes at least a control unit 1000 that has a microprocessor, a RAM, and the like, and a storage unit 1001 which is a large capacity storage, such as a hard disk. The microprocessor of the control unit 1000 reads a program stored in the storage unit 1001 on the RAM and executes the read program, whereby each configuration (a delay device, an LPF, a VCO, an adder, or the like described below) of the modulation unit 10 is realized. Also, hardware of the demodulation unit 22 when the configuration of the demodulation unit 22 is realized by cooperation of hardware and software is the configuration shown in FIG. 15. In this case, the microprocessor of the control unit 1000 reads a program stored in the storage unit 1001 on the RAM and executes the read program, whereby each configuration (an HPF, a STFT unit, a subtracter, an LPF, a DC cut unit, a binarization unit, a data detection unit, a data detection trigger generation unit, or the like described below) of the demodulation unit 22 is realized. The modulation unit 10 and the demodulation unit 22 may include a configuration (for example, an operating unit, a display unit, a communication unit, or the like) other than the configuration illustrated in FIG. 15.

[3. Configuration of Modulation Unit in Transmission Apparatus]

Figure 2:
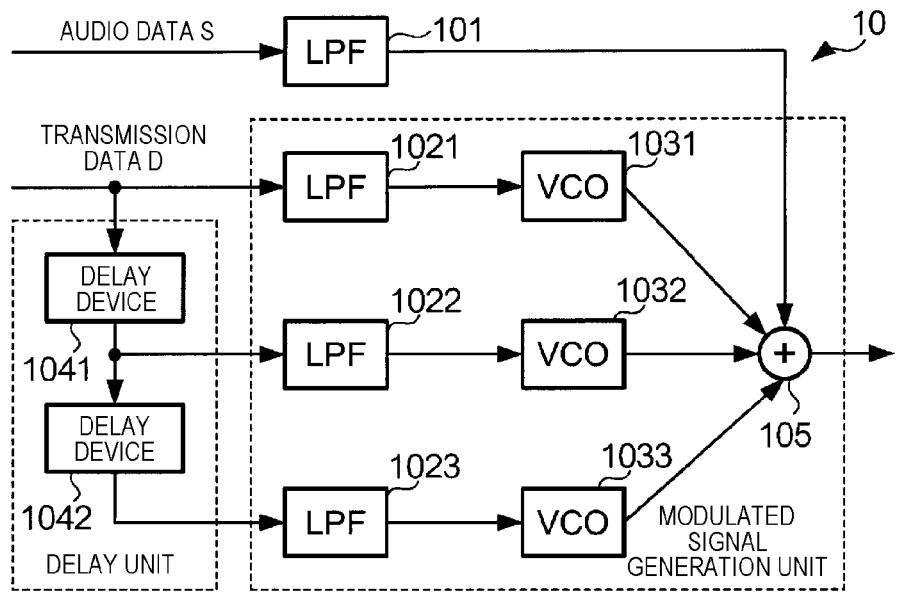
FIG. 2 is a block diagram showing a configuration example of a modulation unit of a transmission apparatus.

FIG. 2 is a diagram showing a configuration example of the modulation unit 10 of the transmission apparatus 1. The modulation unit 10 includes an LPF 101 as a processing system for the audio data S, and includes LPFs 1021 to 1023, VCOs (Voltage-controlled oscillators) 1031 to 1033, delay devices 1041 and 1042, and an adder 105 as a processing system for the transmission data D. The LPF 101 is connected to the adder 105. The LPFs 1021 to 1023 are respectively connected to the adder 105 through the VCOs 1031 to 1033. The LPF 1021 and the LPF 1022 are connected together through the delay device 1041, and the LPF 1022 and the LPF 1023 are connected together through the delay device 1042. The details of the respective units will be described below.

[3-1. Structure of Transmission Data]

Figure 3:
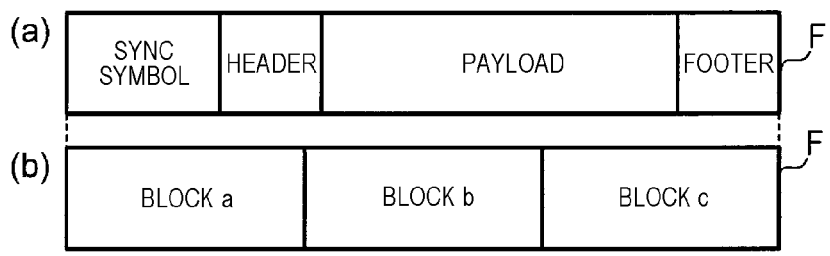
In FIG. 3, (a) is a diagram showing an example of a frame structure of data, and (b) is a diagram conceptually showing the relationship between a frame and blocks.

Prior to describing the specific processing contents of the respective units of the transmission apparatus 1, first, the structure of transmission data which is transmitted by the transmission apparatus 1 will be described. As described above, transmission data to be transmitted is repeatedly transmitted from the transmission apparatus 1 in time series. One unit of repeated transmission is called a frame. FIG. 3($a$) is a diagram showing an example of the structure of a frame. One frame F has a synchronization symbol for finding the head of the frame, a header, in which information relating to the attribute of the frame, such as a frame length, is included, a payload, in which actual data is included, and a footer corresponding to the rear end of the frame in order from the head of the frame. Each of the data length of the synchronization symbol and the data length of the header is a predetermined number of bits, for example, about several bits.

In the reception apparatus 2, one frame is divided into n (where n is a positive integer, and in this embodiment, for example, n=3) units, and demodulated in the divided units. One divided unit is called a block. FIG. 3(b) is a diagram conceptually showing the relationship between a frame and blocks. One frame has three blocks a, b, and c having the same data length. In the block a which is the head of the frame, the synchronization symbol and the header are necessarily included. In the block c which is the tail of the frame, the footer is necessarily included. That is, each of the data length of the synchronization symbol and the header and the data length of the footer is shorter than the data length of one block.

[3-2. Frequency Band for use in Frame Transmission and Transmission Timing]

Figure 4:
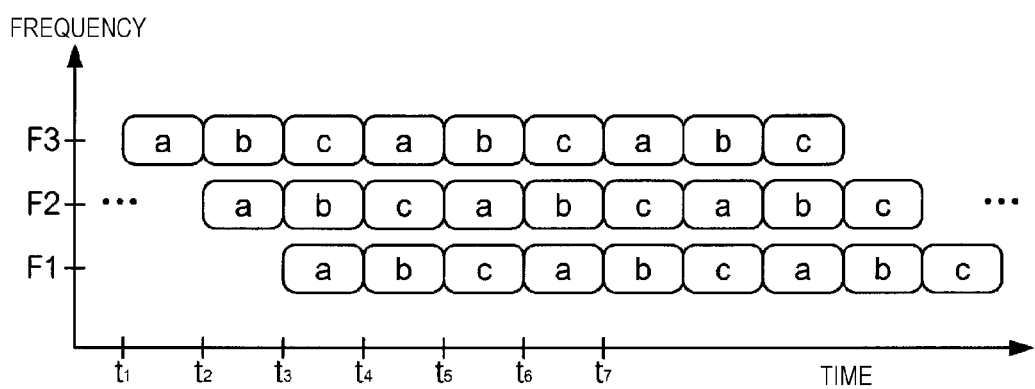
FIG. 4 is a conceptual diagram illustrating a transmission timing of frames.

The transmission apparatus 1 uses different frequency bands and repeatedly transmits one frame in the respective frequency bands. At this time, the transmission apparatus 1 performs control to delay the transmission start timing of each frame in each frequency band by a predetermined time period described below such that the transmission start timing is different between the frames. FIG. 4 is a conceptual diagram illustrating the transmission start timing of a frame. In this drawing, the notation of "a" means the block a, the notation of "b" means the block b, and the notation of "c" means the block c. F1, F2, and F3 mean the frequency bands of carrier waves of transmission data.

As shown in FIG. 4, the transmission apparatus 1 starts the transmission of each frame in each of the different frequency bands F1, F2, and F3 while delaying by a predetermined time period, that is, a time period corresponding to 1/n (in this embodiment, 1/3) of a time period necessary for transmitting one frame (or a time period in which one frame is superimposed in a certain frequency band). For example, the transmission of the block a at the head of the frame starts at the time t1 in the frequency band F3, the transmission of the block a starts at the time t2 in the frequency band F2, and the transmission of the block a starts at the time t3 in the frequency band F1. Accordingly, the transmission start timing of a frame next to the above-described frame is constantly delayed by a time period corresponding to 1/3 of the transmission period of one frame such that the transmission start timing is set to the time t4 in the frequency band F3, the time t5 in the frequency band F2, and the time t6 in the frequency band F1. Therefore, the above-described "1/3 of a time period necessary for transmitting one frame" corresponds to the length of a time period necessary for transmitting one block.

[3-3. Processing System for Transmission Data]

Returning to FIG. 2, the processing system for the transmission data D of the modulation unit 10 will be described. LPFs 1021 to 1023 are filters which remove a frequency component corresponding to a high frequency band to limit the band of a baseband signal, and are called Nyquist filters. A Nyquist filter is generally configured by a FIR filter which is called a cosine roll-off filter, and the order of a filter, a roll-off rate, or the like is determined according to an application condition. In the reception apparatus 2, since filtering by an LPF is performed for a received signal, each of the LPFs 1021 to 1023 and LPFs 2241 to 2243 (see FIG. 6 described below) of the reception apparatus 2 is configured by a root raised cosine roll-off filter such that a perfect Nyquist filter is implemented.

The transmission data D is filtered by the LPF 1021 and then input to the VCO 1031. The VCOs 1031 to 1033 are transmitters whose frequency changes depending on a control signal (here, a bit value of transmission data input to the VCO). The VCO 1031 outputs a signal in a frequency band f3 to the adder 105 when the bit value of transmission data is 1, and outputs a signal in a frequency band f3' to the adder 105 when the bit value of transmission data is 0. Accordingly, the frequency band f3 and the frequency band f3' are used as a pair. In this embodiment, the difference between the values of signals belonging to two frequency bands in a pair is called a differential signal.

Figure 5:
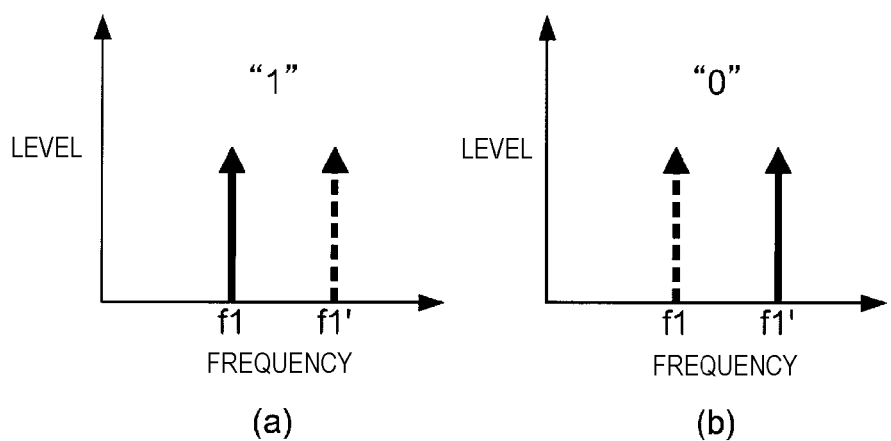
FIG. 5 is a conceptual diagram illustrating a differential signal.

FIG. 5 is a conceptual diagram illustrating a differential signal. As described above, the signal in the frequency band f3 is output when the bit value of transmission data is 1, and the signal in the frequency band f3' is output when the bit value is 0. Accordingly, when the bit value of transmission data is 1, as shown in FIG. 5(a), the signal in the frequency band f3 is output as a predetermined value (indicated by a solid line), and the signal in the frequency band f3' is not output (indicated by a dotted line). On the other hand, when the bit value of transmission data is 0, as shown in FIG. 5(b), the signal in the frequency band f3 is not output (indicated by a dotted line), and the signal in the frequency band f3' is output as a predetermined value (indicated by a solid line). In this way, the signal in the frequency band f3 and the signal in the frequency band f3' have the magnitude relationship between the values of the signals being reversed, i.e., inverted-relation outputs between them depending on the bit value.

It is determined that the bit value is 1 when the difference (f3–f3') between the signal in f3 and the signal in f3' exceeds a threshold value, and it is determined that the bit value is 0 when the difference (f3–f3') between the signal in f3 and the signal in f3' is equal to or smaller than the threshold value. Although a way of determining the threshold value will be described in detail in the description of the reception apparatus 2, the threshold value dynamically changes according to the influence of multipath fading or the like, not a prescribed fixed value. The frequency band F1 described referring to FIG. 4 means a band in which the frequency bands f1 and f1' are combined, the frequency band F2 means a band in which the frequency bands f2 and f2' are combined, and the frequency band F3 means a band in which the frequency bands f3 and f3' are combined. That is, the frequency band F1 includes the frequency bands f1 and f1' having narrower bandwidth, the frequency band F2 includes the frequency bands f2 and f2' having narrower bandwidth, and the frequency band F3 includes the frequency bands f3 and f3' having narrower bandwidth. In the present invention, since the frequency bands f1, f1', f2, f2', f3, and f3' have bandwidth narrower than the frequency bands F1, F2, and F3, these are called narrow-band frequencies. In this embodiment, for example, near frequency bands are paired, such as the frequency bands f1=18000 Hz, f1'=18400 Hz, f2=18800 Hz, f2'=19200 Hz, f3=19600 Hz, and f3'=20000 Hz. In the pairs, the time-varying waveforms of signal components belonging to the lower frequency bands f1, f2, and f3 are called normal signals, and the time-varying waveforms of signal components belonging to the higher frequency bands f1', f2', and f3' are called inverted signals.

Returning to FIG. 2, if transmission data (hereinafter, referred to as frame data) for one frame is input, each of the delay devices 1041 and 1042 outputs transmission data while delaying by a time period corresponding to 1/3 of the transmission period of one frame, that is, a time period (hereinafter, referred to as 1/3 frame transmission period)

necessary for transmitting one block. Accordingly, the delay device 1041 outputs, to the LPF 1022, frame data which is delayed by the 1/3 frame transmission period from the timing, at which frame data is input to the LPF 1021. The VCO 1032 outputs a signal in the frequency band f2 to the adder 105 when the bit value of frame data output from the LPF 1022 is 1, and outputs a signal in the frequency band f2' to the adder 105 when the bit value of frame data is 0. Similarly, the delay device 1042 outputs, to the LPF 1023, frame data which is delayed by the 1/3 frame transmission period from the timing, at which frame data is input to the LPF 1022. The VCO 1033 outputs a signal in the frequency band f1 to the adder 105 when the bit value of frame data output from the LPF 1023 is 1, and outputs a signal in the frequency band f1' to the adder 105 when the bit value of frame data is 0.

[3-4. Processing System for Audio Data]

Next, the processing system for the audio data S of the modulation unit 10 will be described. The LPF 101 removes a frequency component in a high frequency band from the audio data S. The cutoff frequency of the LPF 101 is set to, for example, about the upper limit value (from ten and several kHz to about 20 kHz) of an audible frequency band such that auditory quality of the audio data S by an audience can be secured and a band (modulation band) for use in modulation can be secured. The cutoff frequency becomes a lower limit frequency of the modulation band. This is because, if the cutoff frequency of the LPF 101 is too low, quality at the time of the emission of the audio data S is deteriorated, and if the frequency of the modulation band is lowered in conformity with the low cutoff frequency, sound at the time of the emission of a modulated signal belonging to the modulation band is recognizable to the audience's ears. Conversely, if the cutoff frequency of the LPF 101 is too high, it is not possible to widen the modulation band, and the transmission rate of transmission data decreases. The signal output from the LPF 101 is input to the adder 105.

In the adder 105, a modulated signal based on the transmission data D is added to an audio signal based on the audio data S. The audio signal with the modulated signal added thereto is supplied to the output unit 11, and sound based on the modulated signal and the audio signal is emitted from the speaker 12. Also, a case where the audio signal based on the audio data S is not supplied to the adder 105 is considered. In this case, only the modulated signal is supplied to the output unit 11, and sound (audio signal) based on only the modulated signal is emitted from the speaker 12.

In the above-described configuration of the modulation unit 10, the delay devices 1041 and 1042 function as a delay unit for delaying the transmission start timing of a frame corresponding to one unit of transmission data by a predetermined time period. The LPFs 1021 to 1023, the VCOs 1031 to 1033, and the adder 105 function as a modulated signal generation unit for generating a modulated signal by modulating a carrier wave in a frequency band which differs depending on the transmission start timing by using the frame whose transmission start timing is delayed.

[4. Configuration of Demodulation Unit in Reception Apparatus]

Figure 6:
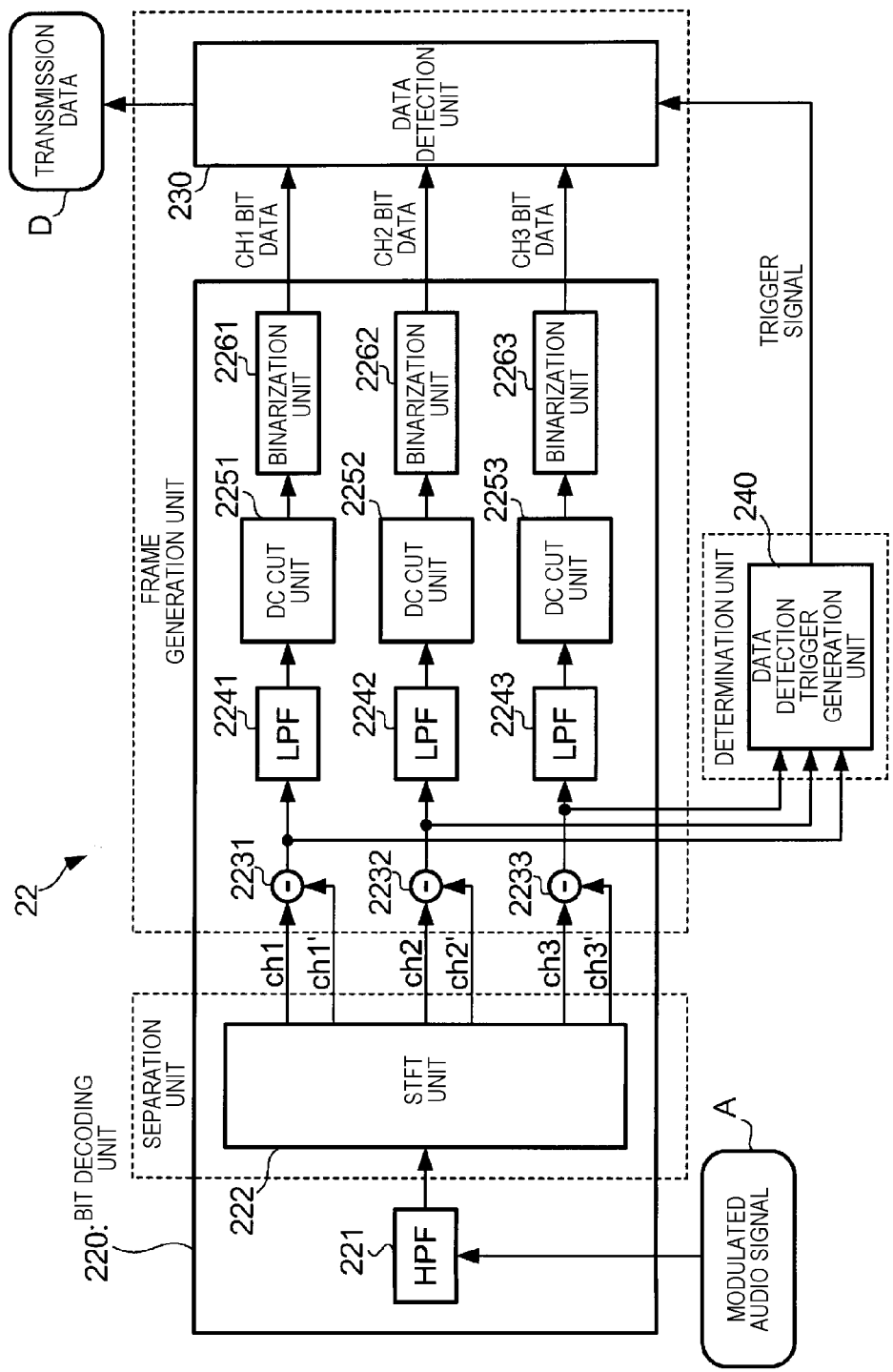
FIG. 6 is a block diagram showing a configuration example of a demodulation unit of a reception apparatus.

FIG. 6 is a block diagram showing a configuration example of the demodulation unit 22 of the reception apparatus 2. The demodulation unit 22 includes a bit decoding unit 220, a data detection unit 230, and a data detection trigger generation unit 240. An audio signal collected by the microphone 20 and subjected to A/D conversion by the input unit 21 is input to the bit decoding unit 220. In this case, since the audio signal to be input includes an audio signal corresponding to the transmission data D modulated by the transmission apparatus 1, the audio signal which is input to the bit decoding unit 220 is called a modulated audio signal A. The bit decoding unit 220 converts the audio signal corresponding to the transmission data D in the input modulated audio signal A to binary data of "1" or "0" to decode a bit value, and outputs binary data to the data detection unit 230. The data detection unit 230 extracts the transmission data D from binary data output from the bit decoding unit 220 at the timing at which a trigger signal is supplied from the data detection trigger generation unit 240. Hereinafter, the details of the respective units will be described.

[4-1. Bit Decoding Unit]

The bit decoding unit 220 includes an HPF 221, a STFT unit 222, subtracters 2231 to 2233, DC cut units 2251 to 2253, and binarization units 2261 to 2263.

[4-1-1. HPF]

The HPF 221 removes a signal component in a low frequency band corresponding to the audio data S from the input modulated audio signal A and extracts a signal component in a high frequency band corresponding to the transmission data D. That is, the cutoff frequency of the HPF 221 is set to the lower limit frequency of the modulation band.

[4-1-2. STFT Unit]

The STFT unit 222 is a separation unit for separating a signal output from the HPF 221 into signal components belonging to the frequency bands f1, f1', f2, f2', f3, and f3' used at the time of the transmission. Specifically, the STFT unit 222 carries out short-time Fourier transform (STFT) for the signal output from the HPF 221, separates the signal into the signal components belonging to the above-described frequency bands f1, f1', f2, f2', f3, and f3', and outputs the time-varying waveforms of the respective signal components. In the short-time Fourier transform at this time, an overlap ratio is 50%, that is, the STFT unit 222 performs STFT by half overlap. For example, the FFT length is 1024 samples, and one symbol sample length is 1536 samples, and a sampling frequency after STFT is 86.1328125 Hz. Although one symbol sample length is, for example, 1, 1.5, 2 times or the like the FFT length, in this embodiment, one symbol sample length is 1.5 times the FFT length. The sampling frequency after STFT is calculated from the FFT length and the overlap ratio.

[4-1-3. Subtracter]

The subtracters 2231 to 2233 are provided corresponding to the pairs of the frequency bands f1, f1', f2, f2', f3, and f3', and each calculates the difference between the normal signal and the inverted signal in the corresponding frequency band. For example, the subtracter 2231 subtracts a signal value ch1' of the inverted signal belonging to the frequency band f1' from a signal value ch1 of the normal signal belonging to the frequency band f1, the subtracter 2232 subtracts a signal value ch2' of the inverted signal belonging to the frequency band f2' from a signal value ch2 of the normal signal belonging to the frequency band f2, and the subtracter 2233 subtracts a signal value ch3' of the inverted signal belonging to the frequency band f3' from a signal value ch3 of the normal signal belonging to the frequency band f3. Accordingly, the differential signals ch1−ch1', ch2−ch2', and ch3−ch3' corresponding to the respective pairs of the frequency bands f1, f1', f2, f2', f3, and f3' are obtained.

[4-1-4. LPF]

The LPFs 2241 to 2243 are provided corresponding to the respective pairs of the frequency bands f1, f1', f2, f2', f3, and f3', and remove a signal component in a high frequency band from the differential signals input from the subtracters 2231 to 2233, and extract a signal component in a frequency band to which a baseband signal belongs. As described above, the LPFs 1021 to 1023 of the transmission apparatus 1 and the LPFs 2241 to 2243 of the reception apparatus 2 are configured such that a perfect Nyquist filter is implemented.

[4-1-5. DC Cut Unit]

The DC cut units 2251 to 2253 are provided corresponding to the respective pairs of the frequency bands f1, f1', f2, f2', f3, and f3', and extract baseband signals from signals output from the LPFs 2241 to 2243. Specifically, the DC cut units 2251 to 2253 perform processing (envelope processing) for correcting an envelope for the signals output from the LPFs 2241 to 2243, and remove a DC offset to extract the baseband signals.

Figure 7:
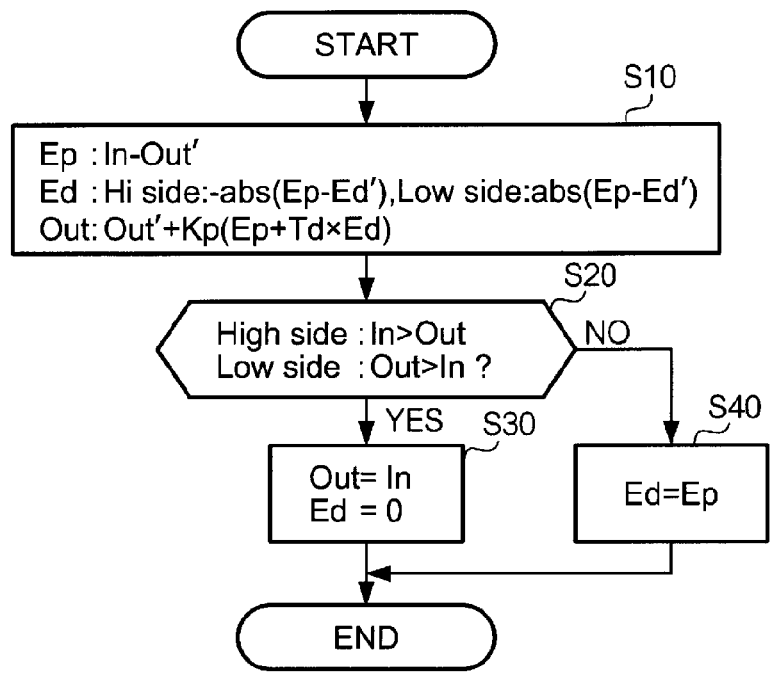
FIG. 7 is a flowchart showing a procedure example of envelope processing.

FIG. 7 is a flowchart showing a procedure of envelope processing. In FIG. 7, terms means as follows:

In: Input signal which is input from the LPF 2241 to the DC cut unit 2251, Out: Output signal which is output from the DC cut unit 2251, Kp: P control coefficient (for example, 0.1) in the envelope processing, Td: D control coefficient (for example, 1.0) in the envelope processing, and Out', Ed': Values in previous processing (initial values are 0.0).

First, the DC cut unit 2251 obtains Ep, Hi Side, Low Side, Out (Step S10) according to the calculation formulas.

$Ep = In - Out'$, upper envelope Hi Side of baseband signal=−abs $(Ep − Ed')$, lower envelope Low Side of baseband signal=abs $(Ep − Ed')$, and $Out = Out' + Kp(Ep + Td \times Ed)$ Next, if In>Out on the upper envelope Hi Side of the baseband signal, and Out>In on the lower envelope Low Side of the baseband signal (Step S20; YES), the DC cut unit 2251 sets that Out=In and Ed=0 (Step S30). If the above-described determination is negative (Step S20; NO), the DC cut unit 2251 sets that Ed=Ep (Step S40).

In this case, on the Hi Side, the DC cut unit 2251 sets an envelope following the input signal In at the rising edge of the input signal In and attenuates the envelope in a minus direction at the falling edge of the input signal In. This processing is performed, whereby followability to change in volume level of collected audio or burst noise is improved. On the Low Side, the DC cut unit 2251 performs reverse processing to that described above, that is, sets an envelope following the input signal In at the falling edge of the input signal In and attenuates the envelope in a plus direction at the rising edge. The DC cut units 2252 and 2253 perform envelope processing using the input signals input from the LPFs 2242 and 2243 according to the same procedure as described above.

Figure 8:
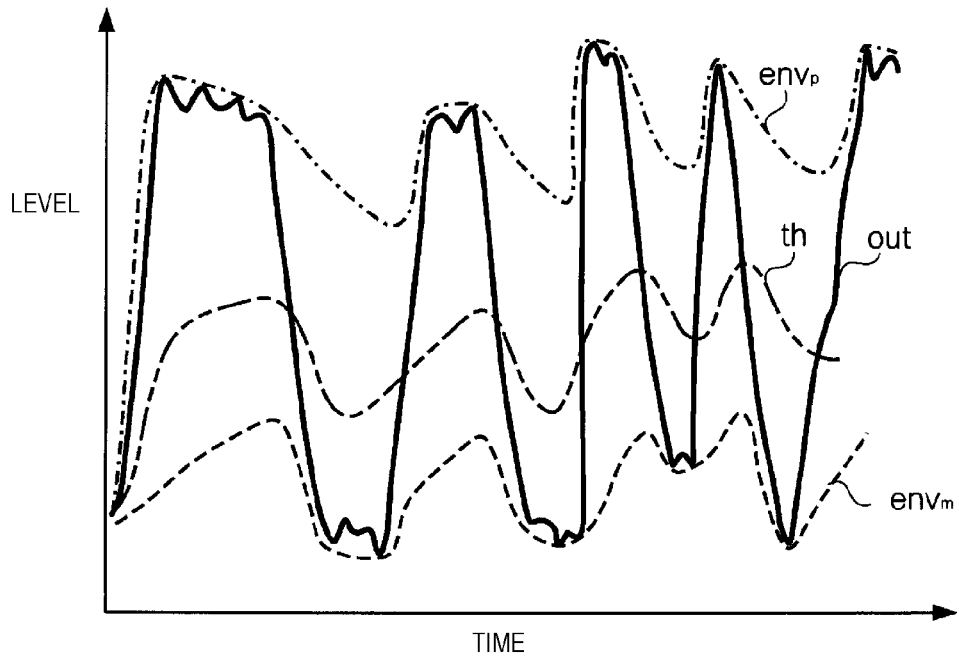
FIG. 8 is a graph showing the result of envelope processing.

FIG. 8 is a graph showing an example of the relationship among a waveform Out (solid line) of a signal (baseband signal) output from the DC cut unit 2251, an upper envelope $env_p$ (one-dot-chain line), a lower envelope $env_m$ (dotted line), and a threshold value th (two-dot-chain line) for use when binarization is performed based on a differential signal. Although the threshold value th is a value between the upper envelope $env_p$ and the lower envelope $env_m$, typically, an intermediate value between the upper envelope $env_p$ and the lower envelope $env_m$ is used. Accordingly, the threshold value th is a value which temporally varies between the upper envelope $env_p$ and the lower envelope $env_m$ with temporal changes in the upper envelope upper envelope $env_p$ and the lower envelope $env_m$.

[4-1-6. Binarization Unit]

As described above, each of the binarization units 2261 to 2263 binarizes the baseband signal (here, the above-described differential signal) using the time-varying threshold value th, decodes the bit value, and outputs the bit value to the data detection unit 230. Specifically, each of the binarization units 2261 to 2263 outputs the bit value "1" when the signal value of the differential signal is greater than the threshold value th at this time, and outputs the bit value "0" when the signal value of the differential signal is equal to or smaller than the threshold value th at this time. As described above, the threshold value th varies with temporal changes in the upper envelope $env_p$ and the lower envelope $env_m$. For example, when the signal reception strength of one of the frequency bands f1 and f1' is lowered due to the influence of multipath fading, noise mixing, or the like, one of the upper envelope $env_p$ and the lower envelope $env_m$ fluctuates, and the difference between both envelopes decreases. Accordingly, when the threshold value is fixed to a prescribed value, since the difference between the upper envelope $env_p$ and the lower envelope $env_m$ decreases, and the differential signal leans toward the upper envelope or the lower envelope and becomes close to a flat waveform, an error is likely to occur in bit determination. In contrast, in this embodiment, even when the difference between the upper envelope $env_p$ and the lower envelope $env_m$ decreases, and high precision is required for bit determination using the threshold value, since the threshold value th is adjusted over time as the intermediate value between the upper and lower envelopes, an error is unlikely to occur in bit determination. With this, tolerance for multipath fading or noise mixing is improved, and precision of bit determination increases.

[4-2. Data Detection Trigger Generation Unit]

Figure 9:
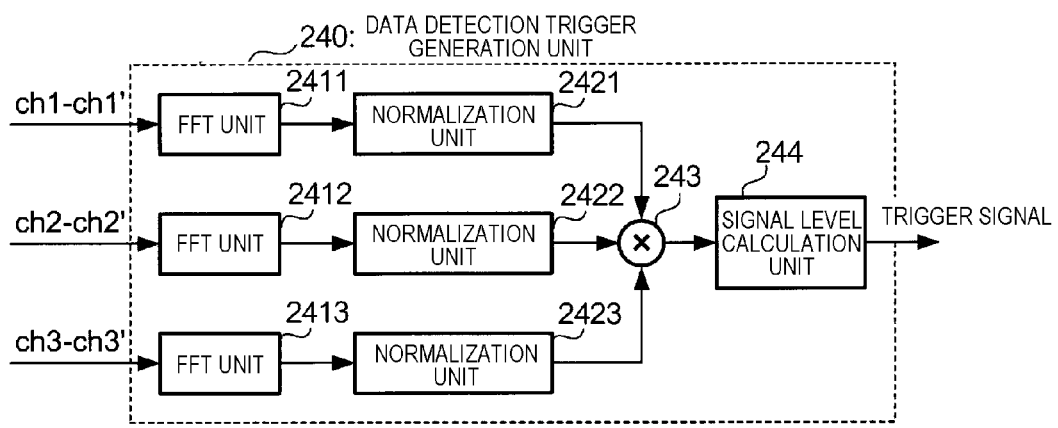
FIG. 9 is a block diagram showing a configuration example of a data detection trigger generation unit.

As described above, although the transmission data D is superimposed on the audio data S, for example, when temporarily or intermittently transmitting the transmission data D, the transmission data D is not sometimes superimposed on the audio data S. In this case, it is efficient that the data detection unit 230 performs data detection only in a time period during which the transmission data D is superimposed on the audio data S. Accordingly, the data detection trigger generation unit 240 gives notification of the timing at which data detection starts to the data detection unit 230. FIG. 9 is a block diagram showing the configuration of the data detection trigger generation unit 240. The data detection trigger generation unit 240 includes FFT units 2411 to 2413, normalization units 2421 to 2423, a multiplier 243, and a signal level calculation unit 244.

The FFT units 2411 to 2413 are provided corresponding to the respective pairs of the frequency bands f1, f1', f2, f2', f3, and f3', carry out FFT (Fast Fourier Transform) for the differential signals ch1−ch1', ch2−ch2', and ch3−ch3' input from the subtracters 2231 to 2233, and output the resultant spectrums. The overlap ratio in the FFT at this time is, for example, one of 25%, 50%, 75%, or no overlap. Accordingly, if the FFT length is, for example, 512 samples and the overlap ratio is 25%, FFT is performed at an interval of 128 samples.

Next, the normalization units 2421 to 2423 normalize the spectrums output from the FFT units 2411 to 2413. The multiplier 243 calculates the product of the elements of the spectrums obtained from the normalization units 2421 to 2423. With this, a so-called running spectrum is obtained.

In a time period during which the transmission data D is superimposed on the audio data S, the differential signals ch1−ch1', ch2−ch2', and ch3−ch3' input from the subtracters 2231 to 2233 correspond to the baseband signals. For example, in the FFT with the FFT length of 512 samples, while the maximum frequency is about 29.06 Hz (FFT: the order N in the fast Fourier transform=43), a demodulated baseband signal becomes close to a square wave and thus corresponds to a harmonic, and if this is taken into consideration, it is experimentally understood that the maximum frequency is about 33.64 Hz (N≅50). In contrast, in a time period during which the transmission data D is not superimposed on the audio data S, since a signal input from each of the subtracters 2231 to 2233 corresponds to noise, a spectrum is distributed in a wider frequency band than a case where the transmission data D is superimposed on the audio data S.

Accordingly, the signal level calculation unit 244 can estimate a signal level by calculating the ratio of frequency components equal to or less than N=50, which are assumed that a baseband signal close to a square wave is included, in the entire spectrum. That is, as the ratio of the frequency components equal to or less than N=50 in the entire spectrum is great, the transmission data D is highly likely to be superimposed on audio, that is, the signal level is great. The signal level calculation unit 244 outputs a trigger signal to cause the data detection unit 230 to start data detection when the estimated value exceeds a threshold value. In this way, the signal level calculation unit 244 determines whether or not the transmission data D is superimposed on the audio data S by measuring the running spectrum of the differential signals of the frequency bands f1, f1', f2, f2', f3, and f3' before the LPFs 2241 to 2243 are carried out, and performs data detection only when it is determined to be superimposed.

[4-3. Data Detection Unit]

Figure 10:
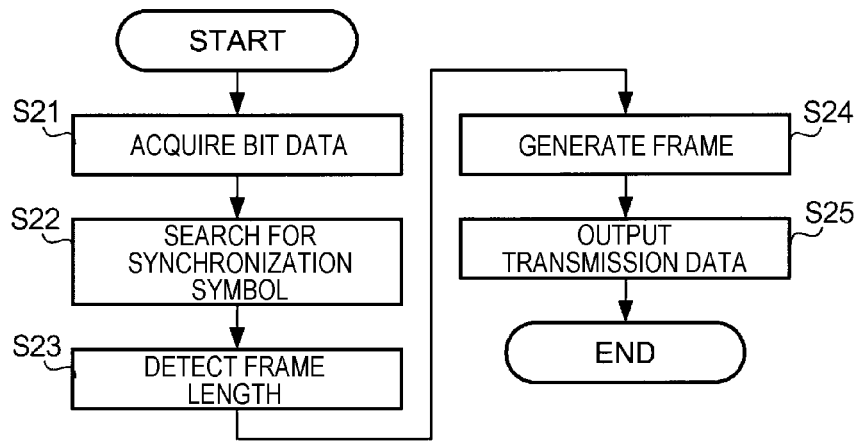
FIG. 10 is a flowchart showing a procedure example of data detection processing.

The data detection unit 230 extracts transmission data from bit data output from the binarization units 2261 to 2263. FIG. 10 is a flowchart showing the operation of the data detection unit 230. In FIG. 10, first, the data detection unit 230 acquires bit data output from the binarization units 2261 to 2263 (Step S21).

Next, the data detection unit 230 searches for a synchronization symbol (Step S22). In this step, for example, the data detection unit 230 acquires a bit stream at every two bits with an initial bit in CH1 bit data in the frequency band F1 as a start position (hereinafter, referred to as a search start bit) (see FIG. 11(a)). As described above, since the STFT unit 222 performs STFT by half overlap, and one symbol sample length (1536 samples) is 1.5 times the FFT length (1024 samples), the baseband signal is expanded three times. For this reason, the data detection unit 230 acquires a bit stream at every two bits.

As described above, since the data length of the synchronization symbol is a predetermined number of bits, when a bit stream having a predetermined number of bits is acquired from the search start bit, the data detection unit 230 performs determination about whether or not the bit stream coincides with the a prescribed bit stream of the synchronization symbol. If the acquired bit stream coincides with the synchronization symbol, the data detection unit 230 progresses to subsequent processing. When the acquired bit stream does not coincide with the synchronization symbol, the data detection unit 230 performs determination about whether or not a bit stream having a predetermined number of bits from the search start bit coincides with the bit stream of the synchronization symbol for CH2 bit data in the frequency band F2 different from before (see FIG. 11(b)). Then, when no synchronization symbols are found in the CH1 bit data, the CH2 bit data, or the CH3 bit data, the data detection unit 230 returns to the CH1 bit data in the initial frequency band (F1), shifts the position of the search start bit by one bit from the last position, and performs determination about whether or not a bit stream having a predetermined number of bits from the search start bit coincides with the bit stream of the synchronization symbol to re-search a synchronization symbol (see FIG. 11(c)). The data detection unit 230 repeats the processing until a synchronization symbol is found.

If a synchronization symbol is found, the data detection unit 230 further acquires a bit stream having a predetermined number of bits at every two bits from the position of a bit corresponding to the rear end of the synchronization symbol in bit data where the synchronization symbol is found. The bit stream corresponds to the header of the frame. Since the frame length is described in the header, the data detection unit 230 performs decoding and error detection only for the header and detects the frame length (Step S23).

Next, the data detection unit 230 divides the frame length by the number of blocks (in this case, three) in one frame, thereby obtaining the data length of one block. Then, the data detection unit 230 extracts the blocks a, b, and c from bit data output from the binarization units 2261 to 2263 under the following condition and connects the blocks to generate a frame (Step S24).

Figures 11, 12:
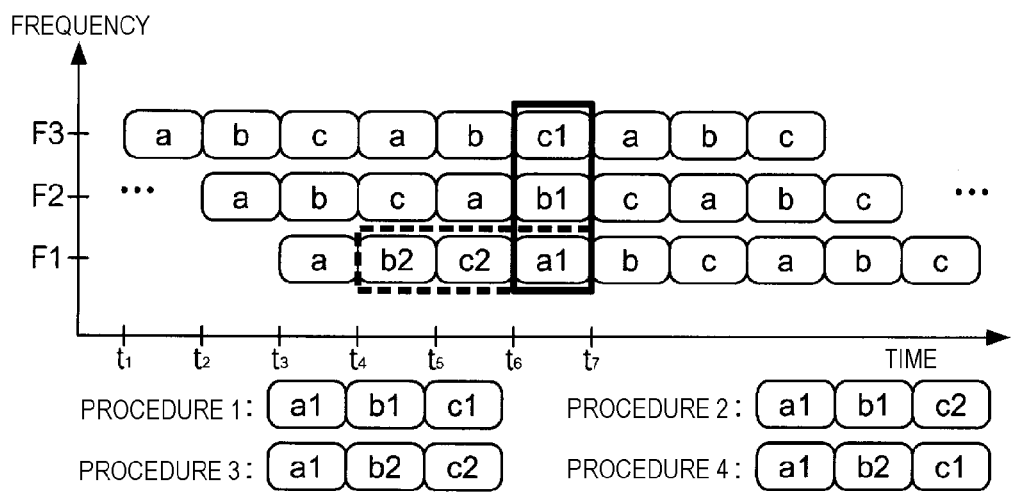
FIG. 11 is a conceptual diagram illustrating a detection procedure of a synchronization symbol.
FIG. 12 is a conceptual diagram illustrating a rule when a block is extracted to configure a frame.

FIG. 12 is a conceptual diagram illustrating a condition when blocks are extracted to generate a frame. In FIG. 12, a1, b1, b2, c1, and c2 are the same blocks as a, b, and c notated by the same alphabetical letters, but for ease of understanding of the description of blocks to be selected, the number 1 or 2 is attached for distinction. The interval between the times t1 to t7 is a time period (1/3 of the time period necessary for transmitting one frame described above, and hereinafter, referred to as one block transmission period) necessary for receiving one block. It is assumed that the current time is t7, and blocks received by the reception apparatus 2 in the respective frequency bands F1, F2, and F3 to the time t7 are stored in a storage unit (not shown) of the reception apparatus 2 (demodulation unit 22).

The data detection unit 230 selects the remaining blocks b and c necessary for forming a frame according to a prescribed selection method with the block a received at the time t7, that is, a block (in the drawing, the block a1) at the head of one frame as a start point. The prescribed selection method includes the following four procedures. The data detection unit 230 attempts frame decoding and error detection in order from the procedure 1 to the procedure 4, and when transmission data for one frame can be correctly demodulated in a certain procedure, does not perform any subsequent procedures.

Procedure 1: At the current time t7 at which the block a1 is received, the block b1 and the block c1 which are received in the frequency bands F2 and F3 different from the block a1 are selected (the block a1, the block b1, and the block c1 surrounded by a solid line in the drawing). That is, in the procedure 1, the blocks are respectively selected from all frequency bands in the 11 block transmission periods. Accordingly, a time period necessary until the reception apparatus 2 collects sound, on which transmission data for one frame is superimposed, is a transmission period for one block.

Procedure 2: The block b1 received in the frequency band F2 different from the block a1 at the current time t7, at which the block a1 is received, and the block c2 received in the same frequency band F1 as the block a1 at the time t6 one block before the current time t7, are selected. That is, in the procedure 2, the blocks are selected from a plurality of frequency bands in an arbitrary combination in a time period longer than the transmission period for one block and shorter than the time period necessary for transmitting one frame.

Procedure 3: The block b2 received in the same frequency band F1 as the block a1 at the time t5 two blocks before the current time t7 and the block c2 received in the same frequency band F3 as the block a1 at the time t6 one block before the current time t7 are selected (the block a1, the block b2, and the block c2 surrounded by a dotted line in the drawing). That is, in the procedure 3, the blocks are selected from one frequency band in the time period necessary for transmitting one frame.

Procedure 4: The block b2 received in the same frequency band F1 as the block a1 at the time t5 two blocks before the current time t7 and the block c1 received in the frequency band F3 different from the block a1 at the current time t7, at which the block a1 is received, are selected. That is, in the procedure 4, the blocks are respectively selected from a plurality of frequency bands in an arbitrary combination in the time period necessary for transmitting one frame. The procedure 4 is used when there is a large influence of multipath fading, noise mixing on any frequency band, or the like, compared to the procedure 3.

If all of the blocks a, b, and c are gathered at the current time t7 after data detection starts, a substantial time necessary for data detection in the procedure 1 is t7−t6 (that is, 1/3 of the time period necessary for transmitting one frame). Accordingly, in the procedure 1, when all blocks forming one frame are successfully detected, of the procedures 1 to 4, a substantial transmission rate is the highest. That is, a time period necessary until the microphone 20 collects audio, on which these blocks are superimposed, is shortest.

Accordingly, when data detection is successfully performed in the procedure 2, a substantial time necessary for data detection is t7−t5 (that is, 2/3 of the time period necessary for transmitting one frame). Therefore, the procedure 2 has a second highest substantial transmission rate after the procedure 1.

When data detection is successfully performed in the procedures 3 and 4, a substantial time necessary for data detection is t7−t4 (that is, the same period as the time period necessary for transmitting one frame). Accordingly, when data detection is successfully performed in the procedures 3 and 4, a substantial transmission rate is the lowest. That is, a time period necessary until the microphone 20 collects audio, on which these blocks are superimposed, is the longest. In the procedures 3 and 4, while the influence of multipath fading, noise mixing, or the like can be suppressed, the transmission rate does not change compared to a case where a single frequency band is used.

Accordingly, if there is no multipath fading or the like which adversely affects transmission quality, in this embodiment, the time period necessary for transmitting one frame takes, at the shortest, a time period of 1/3 of a time period necessary for transmitting one frame without dividing into frequency bands. Even when the adverse influence leads to degradation of transmission quality, in this embodiment, if a time period necessary for transmitting one frame without dividing into frequency bands is taken at the longest, there is a high possibility that one frame can be transmitted.

When the blocks are selected in order from the procedure 1 to the procedure 4 and frame decoding and error detection are attempted, in summary, this means that the reduction in the time period necessary until the microphone 20 collects sound, on which blocks to be selected are superimposed, is preferentially made. That is, the data detection unit 230 selects blocks according to an algorithm in which a time period necessary for collecting sound, on which selected blocks are superimposed, becomes shorter.

The data detection unit 230 outputs a frame generated through decoding and error detection as transmission data (Step S25). When an error occurs during the above-described processing, the data detection unit 230 returns the initial processing of Step S21 and attempts data detection from the next bit again.

In the configuration of the demodulation unit 22 described above, the STFT unit 222 functions as separation unit for separating an audio signal output from the microphone 20 into signal components belonging to the respective frequency bands. The subtracters 2231 to 2233, the DC cut units 2251 to 2253, the binarization unit 2261, and the data detection unit 230 function as a frame generation unit for demodulating a block corresponding to a part of a frame for each predetermined time period based on each signal component separated by the STFT unit 222 and connecting blocks selected from a demodulated block group to generate the frame. The frame generation unit selects blocks according to a method selected according to a prescribed selection method, for example, a selection method in which the time period necessary until the microphone 20 collects sound, on which the selected blocks are superimposed, becomes shorter. The data detection trigger generation unit 240 functions as a determination unit for performing determination about whether or not the transmission data D is superimposed on sound collected by the microphone 20.

According to the above-described embodiment, the differential signals using different frequency bands are used, whereby the SN ratio is improved compared to a case whether the differential signals are not used. The threshold value when the baseband signals are binarized based on the differential signals is dynamically controlled according to the collection situation of sound belonging to these frequency bands, thereby improving precision of bit determination. The frames are transmitted while shifting the transmission timing among a plurality of frequency bands, whereby tolerance for multipath fading or noise mixing is obtained. While a frequency band which is influenced by a phenomenon, such as multipath fading or noise mixing, temporally fluctuates, according to the above-described embodiment, since the frames are transmitted while shifting the transmission timing among a plurality of frequency bands, it becomes possible to increase options when selecting blocks forming a frame and to extract data from sound in a frequency band which is less influenced by the above-described phenomenon. Since there are many blocks which are options when selecting blocks forming a frame compared to a case where one frame is transmitted using only one frequency band, if blocks are selected according to a prescribed selection method, it becomes possible to reduce the time period necessary for collecting sound on which selected blocks are superimposed. Accordingly, improvement in a substantial transmission rate can be expected compared to a case where one frame is transmitted using only one frequency band, and for example, even if a phenomenon, such as multipath fading or noise mixing, in which a data transmission rate decreases, occurs, it becomes possible to suppress the decrease in the substantial transmission rate.

MODIFICATION EXAMPLES

Modification Example 1

Configuration Example of Modulation Unit

Figure 13:
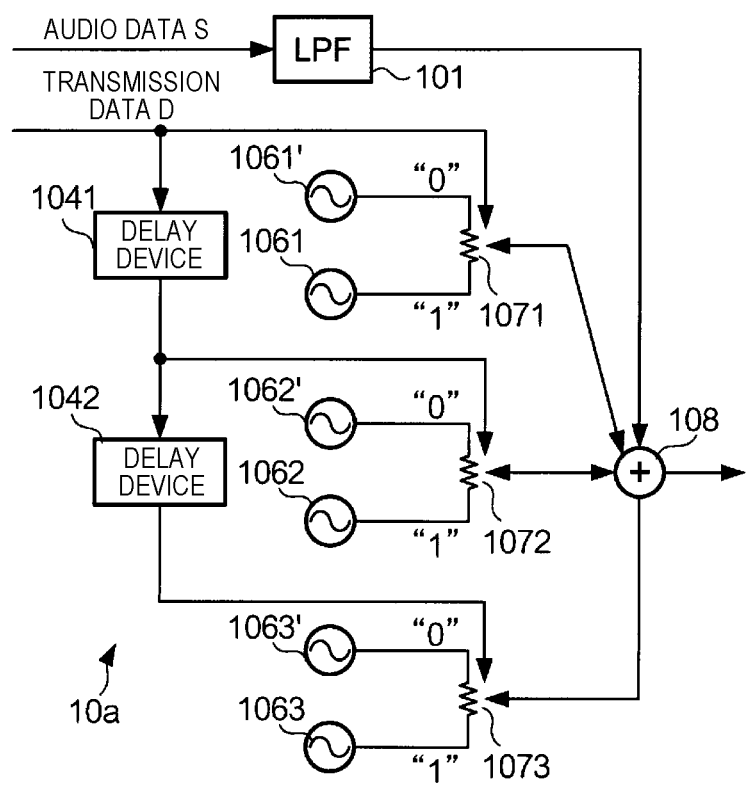
FIG. 13 is a block diagram showing another configuration example of a modulation unit of a transmission apparatus.

The modulation unit 10 shown in FIG. 2 may have a configuration shown in FIG. 13. A modulation unit 10a according to Modification Example 1 includes, as a processing system for audio data S, an LPF 101 which is the same as shown in FIG. 2, and includes, as processing system for transmission data D, delay devices 1041 and 1042 which are the same as shown in FIG. 2, six transmitters 1061 to 1063 and 1061' to 1063', and variable resistors 1071 to 1073, and an adder 108. That is, this modification example is different from the above-described embodiment in that the modulation unit 10a includes the transmitters 1061 to 1063 and 1061' to 1063', the variable resistors 1071 to 1073, and the adder 108. In the variable resistor 1071, one end is connected to the transmitter 1061, the other end is connected to the transmitter 1061', and a movable terminal which is an output terminal moving between the terminals at both ends is connected to the adder 108. In the variable resistor 1072, one end is connected to the transmitter 1062, the other end is connected to the transmitter 1062', and a movable terminal which is an output terminal moving between the terminals at both ends is connected to the adder 108. In the variable resistor 1073, one end is connected to the transmitter 1063, the other end is connected to the transmitter 1063', and a movable terminal which is an output terminal moving between the terminals at both ends is connected to the adder 108. In this modification example, the transmitters 1061 to 1063 and 1061' to 1063', the variable resistors 1071 to 1073, and the adder 108 function as a modulated signal generation unit. Each configuration of the modulation unit 10a may be realized by hardware or may be realized by cooperation of hardware and software.

The transmitter 1061 outputs a signal in a frequency band f3, and the transmitter 1061' outputs a signal in a frequency band f3'. The transmitter 1062 outputs a signal in a frequency band f2, and the transmitter 1062' outputs a signal in a frequency band f2'. The transmitter 1063 outputs a signal in a frequency band f1, and the transmitter 1063' outputs a signal in a frequency band f1'. If transmission data is input to the variable resistor 1071, when the bit value of the transmission data is "1", the variable resistor 1071 moves the movable terminal such that the resistance value decreases from the transmitter 1061 to the adder 108 and the resistance value increases from the transmitter 1061' to the adder 108. With the movement of the movable terminal, the intensity of the signal in the frequency band f3 output from the transmitter 1061 gradually increases, and the intensity of the signal in the frequency band f3' output from the transmitter 1061' gradually decreases. When the bit value of the transmission data is "0", the variable resistor 1071 moves the movable terminal such that the resistance value decreases from the transmitter 1061' to the adder 108 and the resistance value increases from the transmitter 1061 to the adder 108. With the movement of the movable terminal, the intensity of the signal in the frequency band f3' output from the transmitter 1061' gradually increases, and the intensity of the signal in the frequency band f3 output from the transmitter 1061 gradually decreases.

Similarly, the variable resistor 1072 moves the movable terminal such that the resistance value decreases from the transmitter 1062 to the adder 108 and the resistance value increases from the transmitter 1062' to the adder 108 when the bit value of the transmission data is "1", and moves the movable terminal such that the resistance value decreases from the transmitter 1062' to the adder 108 and the resistance value increases from the transmitter 1062 to the adder 108 when the bit value of the transmission data is "0". The variable resistor 1073 moves the movable terminal such that the resistance value decreases from the transmitter 1063 to the adder 108 and the resistance value increases from the transmitter 1063' to the adder 108 when the bit value of the transmission data is "1", and moves the movable terminal such that the resistance value decreases from the transmitter 1063' to the adder 108 and the resistance value increases from the transmitter 1063 to the adder 108 when the bit value of the transmission data is "0".

In the embodiment, for example, when a differential signal is switched from the frequency band f1 to the frequency band f1', the signal in the frequency band f1' is instantaneously generated substantially at the same time the signal in the frequency band f1 is instantaneously vanished. In contrast, in this modification example, when a differential signal is switched from the frequency band f1 to the frequency band f1', the intensity of the signal in the frequency band f1 gradually decreases and the intensity of the signal in the frequency band f1' gradually increases over a time period longer than a time period necessary for instantaneously switching from the frequency band f1 to the frequency band f1' in the embodiment. That is, when causing the outputs of signal components belonging to these narrow-band frequencies to be inverted between them, the inversion is gradually performed over a comparatively long period described above. As in the embodiment, for example, if a differential signal is instantaneously switched from the frequency band f1 to the frequency band f1', since the spectrum of audio to be emitted rapidly changes, the audience may feel a sense of discomfort in auditory sensation. Accordingly, as in this modification example, if switching is made gradually from the frequency band f1 to the frequency band f1', it is possible to perform control such that the sense of discomfort is reduced. The above-described variable resistors 1071 to 1073 may be realized by a mechanical configuration or may be realized by an electrical configuration.

Modification Example 2

When Threshold Value in Demodulation Unit is Fixed

Figure 14:
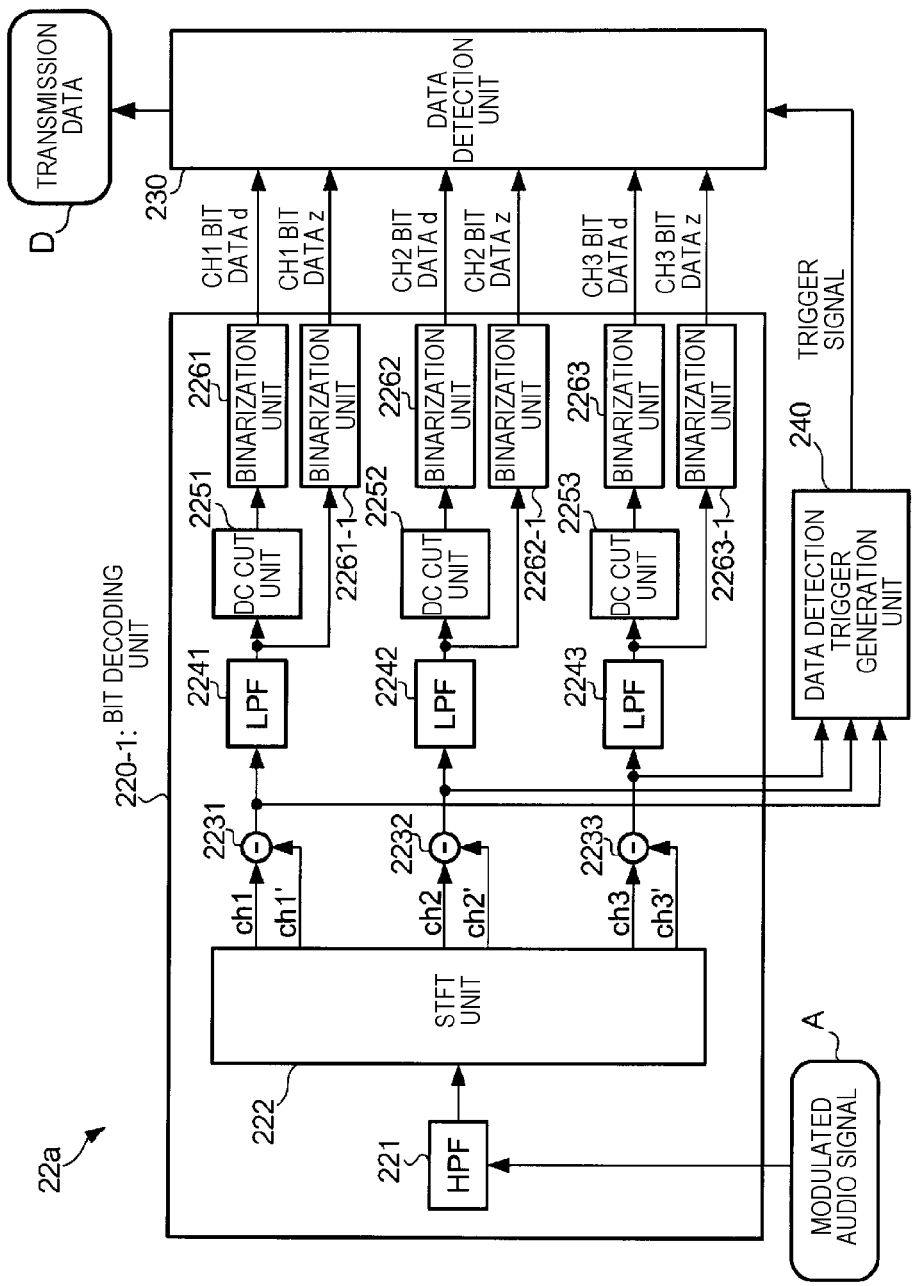
FIG. 14 is a block diagram showing another configuration example of a demodulation unit of a reception apparatus.

In the embodiment, although the threshold value for binarization is dynamically changed, in order to further improve precision of bit determination, the demodulation unit 22 in the reception apparatus 2 may have a configuration shown in FIG. 14, and a fixed threshold value may be used in combination. A demodulation unit 22a according to Modification Example 2 is different from the demodulation unit 22 shown in FIG. 6 in that binarization units 2261-1 to 2263-1, to which the outputs from the LPFs 2241 to 2243 are input directly without passing through the DC cut units 2251 to 2253, are provided. In this modification example, the subtracters 2231 to 2233, the DC cut units 2251 to 2253, the binarization unit 2261, the binarization units 2261-1 to 2263-1, and the data detection unit 230 function as frame generation unit. Each configuration of the demodulation unit 22a may be realized by hardware or may be realized by cooperation of hardware and software.

To the data detection unit 230, bit data (CH1 bit data d, CH2 bit data d, and CH3 bit data d) shown in FIG. 6 passing through the DC cut units 2251 to 2253 is input, and bit data (CH1 bit data z, CH2 bit data z, and CH3 bit data z) without passing through the DC cut units 2251 to 2253 is input. The data detection unit 230 performs binarization for CH1 bit data d, CH2 bit data d, and CH3 bit data d while dynamically changing the threshold value th as in the embodiment, and performs binarization for CH1 bit data z, CH2 bit data z, and CH3 bit data z using a fixed threshold value (in this case, 0). The data detection unit 230 generates a frame using blocks, which show satisfactory results (results in which no error occurs during demodulation), among blocks demodulated using the two kinds of threshold values.

Modification Example 3

Omission of Various Filters

Although the configuration of the demodulation unit 22 or 22a shown in FIG. 6 or 14 uses the HPF 221, when a signal belonging to a band other than the modulation band is not included in the modulated audio signal A so much, or when the influence of the signal is negligible, filtering by the HPF is not be necessarily performed. Similarly, the LPF in the modulation unit 10 or the demodulation unit 22 is not required when the influence of the absence of the LPF is negligible.

Modification Example 4

Number of Blocks and Number of Frequency Bands

In the embodiment, although the number of blocks forming a frame is three, the present invention is not necessarily limited thereto. Although the number of frequency bands F1, F2, and F3 for use in modulation is three, the present invention is not necessarily limited thereto.

When the number of blocks is greater than the number of frequency bands, the substantial transmission rate of transmission data decreases. On the other hand, when the number of frequency bands is greater than the number of blocks, the frequency bands are too many and a redundant configuration is made. Insofar as the decrease in the transmission rate or the redundant configuration is permitted, the number of blocks may be different from the number of frequency bands. For example, the number of blocks forming one frame may be six, and the number of frequency bands for use in modulation may be three. A way of deciding the number of blocks forming one frame and the number of frequency bands for use in modulation is arbitrary.

When the number of blocks forming a frame and the number of frequency bands for use in modulation are n in common such that the number of blocks forming a frame is n (where n is a positive integer, and the same applies to the following description) and the number of frequency bands F1, F2, and F3 for use in modulation is n, the demodulation unit 22 separates an audio signal output from the microphone 20 into signal components belonging to the n frequency bands, and demodulates a block based on each signal component for each time period of 1/n of a time period necessary for collecting sound, on which one frame is superimposed and which belongs to one of the n frequency bands. In this case, in connecting blocks selected from a demodulated block group to generate a frame, the demodulation unit 22 selects the blocks such that a time period necessary for collecting sound, on which the selected blocks are superimposed, is close to a time period of 1/n of a time period necessary for collecting sound, on which one frame is superimposed. In this way, when the number of blocks forming a frame and the number of frequency bands for use in modulation are the same, it is possible to efficiently use the frequency bands.

In the embodiment, the transmission apparatus 1 repeatedly performs transmission in units of frames without dividing into units of blocks, and the reception apparatus 2 cuts the received modulated audio signal in units of blocks and connects the blocks to generate a frame, it is not necessarily so, and the transmission apparatus 1 may transmit data corresponding to a frame while dividing into units of blocks, and the reception apparatus 2 may connect the blocks to generate a frame. In this case, since a header or the like can be attached to each block to be transmitted, and the identifier of each block can be described in the header, the reception apparatus 2 easily identifies each block referring to the identifier.

Modification Example 5

Procedure of Data Detection

In the embodiment, although the prescribed block selection method including the four kinds of procedures of the procedure 1 to the procedure 4 is assumed, if the condition that blocks are selected such that the time period necessary for collecting sound, on which the selected blocks are superimposed, becomes shorter is satisfied, a block selection method other than the above-mentioned four kinds is considered. For example, in an environment in which multipath fading occurs and noise is likely to be included in a signal in each frequency band for use in modulation, when transmitting one frame, a time period longer than a time period necessary for transmitting one frame may be taken. The reason for the use of the block selection method including the four kinds of procedures is that transmission quality at the same time or in the same frequency band as a certain block a (corresponding to the block a1 of FIG. 12), in which the synchronization symbol is successfully extracted, is considered to be high, and if block selection methods are too many, the calculation load of the data detection unit 230 increases or erroneous detection increases.

Modification Example 6

Frequency Bands in Pairs

In the embodiment, although near frequencies are paired, such as the frequency bands f1=18000 Hz, f1'=18400 Hz, f2=18800 Hz, f2'=19200 Hz, f3=19600 Hz, and f3'=20000 Hz, for example, distant frequencies may be paired, such as the frequency bands f1=18000 Hz, f2=18400 Hz, f3=18800 Hz, f1'=19200 Hz, f2'=19600 Hz, and f3'=20000 Hz. For example, when a phenomenon, such as multipath fading or noise mixing, occurs in a certain frequency band, a frequency band comparatively near the frequency is also influenced. Accordingly, as in this modification example, if distant frequencies are paired, improvement in tolerance for the above-described phenomenon can be expected.

In the embodiment, the two narrow-band frequency bands are used, for example, when transmitting the bit "1", a signal belonging to the frequency band f1 is output at a predetermined value and a signal belonging to the frequency band f1' is not output, and when transmitting the bit "0", a signal belonging to the frequency band f1 is not output and a signal belonging to the frequency band f1' is output at a predetermined value. In order to realize a transmission rate twice, four narrow-band frequencies (frequency bands f1, f1', f01, and f01') belonging to the frequency band F1 are prepared. For example, when transmitting the bits "1, 0", a signal belonging to the frequency band f1 is output at a predetermined value and a signal belonging to the frequency band f1' is not output. A signal belonging to the frequency band f01 is not output and a signal belonging to the frequency band f01' is output at a predetermined value. For example, when transmitting the bits "0, 1", a signal belonging to the frequency band f1 is not output and a signal belonging to the frequency band f1' is output at a predetermined value. A signal belonging to the frequency band f01 is output at a predetermined value and a signal belonging to the frequency band f01' is not output. In these cases, however, when focusing on only the frequency bands f1 and f1', the outputs of the signals belonging to the two narrow-band frequencies corresponding to the frame are inverted according to the value of each bit forming the frame, thereby generating a modulated signal.

In the embodiment, although the frequency band of the carrier wave to be modulated is a frequency band higher than a human audible frequency band, the present invention is not necessarily limited thereto.

Modification Example 7

Propagation Medium of Sound

In the above-described embodiment, although it is assumed that the air is a medium through which sound propagates, in addition to gas other than the air, for example, a solid, such as a building, a structure, or furniture, or a liquid, such as water, may be used. When a medium through which sound propagates is a solid, the transmission apparatus 1 includes a vibration unit for generating vibration according to a signal output from the output unit 11, instead of the speaker 12, and the reception apparatus 2 includes a vibration detection unit, such as an acceleration sensor, for detecting vibration of the solid, instead of the microphone 20. When sound is emitted from the solid which vibrates by the vibration unit of the transmission apparatus 1, the reception apparatus 2 may include the microphone 20 as in the embodiment.

Modification Example 8

Transmission Start Timing

The term "transmission start timing" according to the present invention includes substantially the timing which is regarded as the timing at which frame transmission starts, such as the timing at which processing for supplying audio data to the modulation unit 10 for sound emission starts, or the timing at which processing for superimposing transmission data on audio data in the modulation unit 10 starts, in addition to the timing at which an audio signal on which transmission data is superimposed is supplied from the output unit 11 to the speaker 12 and sound emission starts.

Modification Example 9

Threshold Value for Use in Bit Determination

The threshold value when bit determination is performed based on the differential signal may be a fixed threshold value, not the threshold value th which varies over time as in the embodiment.

Modification Example 10

Program

The present invention can be specified as a program for causing a computer to realize the same function as the transmission apparatus 1 or the reception apparatus 2 or a recording medium, such as an optical disc, having the program stored therein. The program according to the present invention may be provided in the form of being downloaded to the computer through a network, such as Internet, installed, and made available.

This application is based on Japanese Patent Application No. 2013-032506, filed on Feb. 21, 2013, and Japanese Patent Application No. 2013-246685, filed on Nov. 28, 2013, the contents of which are incorporated herein by reference.

INDUSTRIAL APPLICABILITY

The present invention is useful in that it is possible to increase possibility of extracting data from sound in a system which transmits data using sound as a transmission medium.

REFERENCE SIGNS LIST

1: transmission apparatus, 2: reception apparatus, 10, 10a: modulation unit, 11: output unit, 12: speaker, 20: microphone, 21: input unit, 22, 22a, 22b, 22c, 22d: demodulation unit, 101, 1021 to 1023, 2241 to 2243: LPF, 1031 to 1033: VCO, 1041, 1042: delay device, 105, 2231 to 2233: adder, 220: bit decoding unit, 221: HPF, 222: STFT unit, 2251 to 2253: DC cut unit, 2261 to 2263, 2261-1 to 2263-1: binarization unit, 230: data detection unit, 240: data detection trigger generation unit, 2411 to 2413: FFT unit, 2421 to 2423: normalization unit, 243: multiplier, 244: signal level calculation unit.

The invention claimed is:
1. A demodulation apparatus comprising:
a separation unit configured to use a frame corresponding to one unit of transmission data and having a transmission start timing delayed by a predetermined time period to separate an audio signal of sound emitted according to a modulated signal generated by modulating a carrier wave in a frequency band that is different depending on the transmission start timing into signal components belonging to the respective frequency bands; and
a frame generation unit configured to demodulate a block forming a part of the frame based on a part of the signal component separated by the separation unit, select and demodulate a block forming a remaining part of the frame according to a prescribed selection-procedure, and connect the demodulated blocks to generate the frame,
wherein the prescribed selection procedure includes a plurality of different procedures relating to a block selection, and
wherein in a case where an error in demodulating an entirety of the frame in one of the plurality of procedures occurs, the frame generation unit performs a subsequent procedure among the plurality of different procedures.
2. The demodulation apparatus according to claim 1, wherein:

frequency bands of carrier waves modulated by modulated signal generation unit are n frequency bands, where n indicates a positive integer, and the frame generation unit demodulates the block based on each signal component for each time period of 1/n of a time period in which one frame is superimposed in any of the n frequency bands.

3. The demodulation apparatus according to claim 1, wherein:

each of the frequency bands includes a plurality of narrow-band frequencies having a bandwidth narrower than the corresponding frequency band, the modulated signal generation unit generates the modulated signal by causing outputs of signals belonging to two narrow-band frequencies corresponding to the frame to be inverted between the signals according to a value of each bit of the frame, the separation unit separates the audio signal into signals belonging to the two narrow-band frequencies included in each of the frequency bands, and the frame generation unit compares a difference between the signals belonging to the two narrow-band frequencies with a threshold value and decodes each value of the bits to demodulate the block.

4. The demodulation apparatus according to claim 3, wherein the frame generation unit calculates an upper envelope and a lower envelope of each signal component separated by the separation unit and uses a time-varying value between the calculated upper envelope and the lower envelope as the threshold value.

5. An audio communication system comprising:

a transmission apparatus for emitting an audio signal, on which transmission data to be transmitted is superimposed, as sound; and a reception apparatus for extracting the transmission data from the sound emitted from the transmission apparatus, wherein the transmission apparatus includes:
 a delay unit configured to delay a transmission start timing of a frame corresponding to one unit of the transmission data by a predetermined time period;
 a modulated signal generation unit configured to generate a modulated signal by modulating a carrier wave in a frequency band that is different depending on the transmission start timing using the frame whose transmission start timing is delayed by the delay unit; and
 a sound emission unit configured to emit the sound according to the modulated signal generated by the modulated signal generation unit, and wherein the reception apparatus includes:
 a sound collection unit configured to collect the sound emitted from the sound emission unit and output an audio signal;
 a separation unit configured to separate the audio signal output from the sound collection unit into signal components belonging to the respective frequency bands; and
 a frame generation unit configured to demodulate a block forming a part of the frame based on a part of the signal component separated by the separation unit, select and demodulate a block forming a remaining part of the frame according to a prescribed selection procedure, and connect the demodulated blocks to generate the frame, wherein the prescribed selection procedure includes a plurality of different procedures relating to a block selection, and wherein in a case where an error in demodulating an entirety of the frame in one of the plurality of procedures occurs, the frame generation unit performs a subsequent procedure among the plurality of different procedures.

6. A non-transitory computer-readable storage medium storing a program executable by a computer to execute a method of demodulating for a demodulating apparatus, the method comprising:

a separation step of using a frame corresponding to one unit of transmission data and having a transmission start timing delayed by a predetermined time period to separate an audio signal of sound emitted according to a modulated signal generated by modulating a carrier wave in a frequency band that is different depending on the transmission start timing into signal components belonging to the respective frequency bands; and a frame generation step of demodulating a block forming a part of the frame based on a part of the signal component separated by the separation step, selecting and demodulating a block forming a remaining part of the frame according to a prescribed selection procedure, and connecting the demodulated blocks to generate the frame, wherein the prescribed selection procedure includes a plurality of different procedures relating to a block selection, and wherein in a case where an error in demodulating an entirety of the frame in one of the plurality of procedures occurs, the frame generation step performs a subsequent procedure among the plurality of different procedures.

7. A method of demodulating in a demodulation apparatus, the method comprising:

a separation step of using a frame corresponding to one unit of transmission data and having a transmission start timing delayed by a predetermined time period to separate an audio signal of sound emitted according to a modulated signal generated by modulating a carrier wave in a frequency band which is different depending on the transmission start timing into signal components belonging to the respective frequency bands; and a frame generation step of demodulating a block forming a part of the frame based on a part of the signal component separated by the separation step, selecting and demodulating a block forming a remaining part of the frame according to a prescribed selection procedure, and connecting the demodulated blocks to generate the frame, wherein the prescribed selection procedure includes a plurality of different procedures relating to a block selection, and wherein in a case where an error in demodulating an entirety of the frame in one of the plurality of procedures occurs, the frame generation step performs a subsequent procedure among the plurality of different procedures.

8. A demodulation apparatus comprising:

a separation unit configured to use a frame corresponding to one unit of transmission data and having a transmission start timing delayed by a predetermined time period to separate an audio signal of sound emitted according to a modulated signal generated by modulating a carrier wave in a frequency band that is different depending on the transmission start timing into signal components belonging to the respective frequency bands; and a frame generation unit configured to demodulate a block forming a part of the frame based on a part of the signal component separated by the separation unit, select and demodulate a block forming a remaining part of the frame according to a prescribed selection procedure, and connect the demodulated blocks to generate the frame, wherein the prescribed selection procedure includes a plurality of different procedures relating to a block selection, and wherein, in a case where the frame generation unit completes demodulating the block forming the remaining part of the frame and correctly demodulates an entirety of the frame in one of the plurality of different procedures, the frame generation unit does not perform any subsequent procedure among the plurality of different procedures.

9. The demodulation apparatus according to claim 1, wherein one of the plurality of different procedures selects each block forming the remaining part of the frame from another signal component that is different from the signal component from which the part of the frame is demodulated.

10. The demodulation apparatus according to claim 1, wherein one of the plurality of different procedures selects each block forming the remaining part of the frame from a signal component same as the signal component from which the part of the frame is demodulated.

11. The demodulation apparatus according to claim 1, wherein at least one of the plurality of different procedures is different from others in a required time for the block selection.

* * * * *